(12) United States Patent
Alsina et al.

(10) Patent No.: US 10,805,683 B2
(45) Date of Patent: Oct. 13, 2020

(54) PRIMING MEDIA APPLICATIONS AND PRESENTING PRIMED MEDIA APPLICATION DATA

(71) Applicant: Apple Inc., Cupertino, CA (US)

(72) Inventors: Thomas Alsina, Saratoga, CA (US); Charles Magahern, San Francisco, CA (US); Edward T. Schmidt, Burlingame, CA (US); Gregory R. Chapman, San Jose, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/290,462

(22) Filed: Mar. 1, 2019

(65) Prior Publication Data

US 2019/0200080 A1 Jun. 27, 2019

Related U.S. Application Data

(63) Continuation of application No. 15/153,707, filed on May 12, 2016, now Pat. No. 10,264,319.

(Continued)

(51) Int. Cl.
*H04N 21/466* (2011.01)
*G06F 9/48* (2006.01)
(Continued)

(52) U.S. Cl.
CPC ........... *H04N 21/4668* (2013.01); *G06F 9/48* (2013.01); *G06F 9/4843* (2013.01);
(Continued)

(58) Field of Classification Search
CPC ....... H04N 21/25–251; H04N 21/4524; H04N 21/466–4668; G06F 9/48–9/458
See application file for complete search history.

(56) References Cited

U.S. PATENT DOCUMENTS

2001/0003835 A1  6/2001 Watts
2002/0198991 A1* 12/2002 Gopalakrishnan .... H04L 67/306
                                                  709/225
(Continued)

OTHER PUBLICATIONS

Obaro Ogbo, How to Code a Simple Android Widget, May 22, 2015 (Year: 2015).

(Continued)

*Primary Examiner* — Robert J Hance
(74) *Attorney, Agent, or Firm* — Invoke

(57) ABSTRACT

In some implementations, a computing device can send a priming command to a media application to cause the media application to load media items and media item metadata into memory associated with the media application. The computing device can predict a media application that is likely to be invoked by a user. The computing device can launch the media application. The computing device can send the priming command to the media application to cause the media application to prepare media items for playback or presentation to the user. After the media application loads the media items, the computing device can receive metadata associated with the loaded media items and present the metadata and appropriate media application controls on a display of the computing device.

20 Claims, 7 Drawing Sheets

Related U.S. Application Data

(60) Provisional application No. 62/172,193, filed on Jun. 7, 2015.

(51) Int. Cl.
*H04N 21/25* (2011.01)
*H04N 21/258* (2011.01)
*H04N 21/45* (2011.01)
*H04N 21/81* (2011.01)
*G11B 27/34* (2006.01)
*G11B 27/10* (2006.01)

(52) U.S. Cl.
CPC ............ *G11B 27/102* (2013.01); *G11B 27/34* (2013.01); *H04N 21/251* (2013.01); *H04N 21/25891* (2013.01); *H04N 21/4532* (2013.01); *H04N 21/8113* (2013.01); *H04N 21/8166* (2013.01)

(56) References Cited

U.S. PATENT DOCUMENTS

| | | | | |
|---|---|---|---|---|
| 2004/0068536 | A1* | 4/2004 | Demers | G06F 16/957 709/201 |
| 2005/0278741 | A1* | 12/2005 | Robarts | H04N 21/4828 725/46 |
| 2008/0005736 | A1 | 1/2008 | Apacible et al. | |
| 2010/0077430 | A1* | 3/2010 | Huysegems | H04N 21/252 725/38 |
| 2010/0192105 | A1 | 7/2010 | Kim et al. | |
| 2012/0041920 | A1* | 2/2012 | Kim | G06N 7/005 706/52 |
| 2014/0068494 | A1 | 3/2014 | Petersen et al. | |
| 2014/0188889 | A1* | 7/2014 | Martens | H04N 21/466 707/740 |
| 2014/0280485 | A1 | 9/2014 | Rafi et al. | |
| 2014/0280702 | A1* | 9/2014 | Barker | H04N 21/6582 709/217 |
| 2014/0280898 | A1* | 9/2014 | Voit | H04L 67/18 709/224 |
| 2014/0372356 | A1 | 12/2014 | Bilal et al. | |
| 2016/0224397 | A1* | 8/2016 | Arora | H04W 4/50 |
| 2016/0286032 | A1* | 9/2016 | Cudak | H04W 4/021 |
| 2016/0360271 | A1 | 12/2016 | Magahern et al. | |

OTHER PUBLICATIONS

David Nield, Put Your Key Apps on the Android Lock Screen for Easy Access, Oct. 2, 2014 (Year: 2014).

* cited by examiner

PRIMING MEDIA APPLICATIONS AND PRESENTING PRIMED MEDIA APPLICATION DATA

INCORPORATION BY REFERENCE; DISCLAIMER

Each of the following applications are hereby incorporated by reference: application Ser. No. 15/153,707 filed on May 12, 2016; application No. 62/172,193 filed on. Jun. 7, 2015. The Applicant hereby rescinds any disclaimer of claim scope in the parent applications or the prosecution history thereof and advises the USPTO that the claims in this application may be broader than any claim in the parent applications.

TECHNICAL FIELD

The disclosure generally relates to presenting media on a computing device.

BACKGROUND

Most computing devices are configured to playback or present media for the user's entertainment. These computing devices present media metadata to a user to allow the user to determine which media item to playback or present on the computing device. For example, a user can invoke a music application. When invoked the music application can cause the computing device to display graphical user interface elements for controlling the playback of music on the computing device. The music application can cause the computing device to display textual metadata describing the currently playing track, the artist, and/or the album associated with the music being played. The music application can cause the computing device to display graphical information for the music track, such as an album cover or other artwork. However, before the computing device can display the media controls for the media application and before the computing device can display the media metadata for the played media item, the user must invoke the media application and select a media item for playback. Thus, the user will be required to log in to the computing device, invoke the music application, select a music track, and press play to cause the computing device to begin playback of the desired music track.

SUMMARY

In some implementations, a computing device can send a priming command to a media application to cause the media application to load media items and media item metadata into memory associated with the media application. The computing device can predict a media application that is likely to be invoked by a user. The computing device can launch the media application. The computing device can send the priming command to the media application to cause the media application to prepare media items for playback or presentation to the user. After the media application loads the media items, the computing device can receive metadata associated with the loaded media items from the media application and present the metadata and appropriate media application controls on a display of the computing device.

Particular implementations provide at least the following advantages: the computing device can provide an improved user experience by anticipating the needs of a user and priming applications running on the computing device to meet those needs; by anticipating and priming the applications that the user wishes to use, the computing device can reduce the time necessary to satisfy a user's request.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
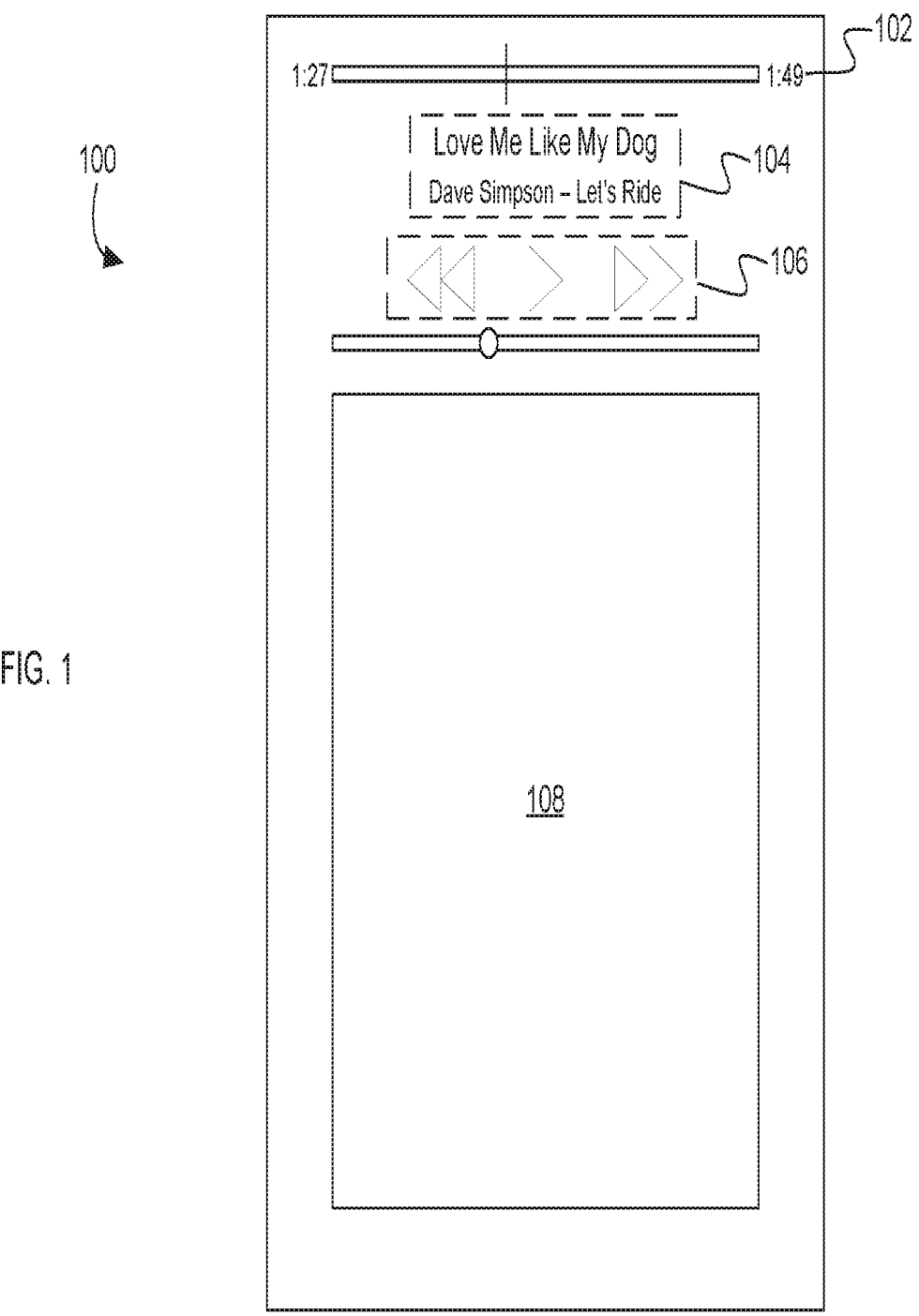
FIG. 1 illustrates an example graphical user interface for presenting media application metadata on a display of a computing device.

FIG. 1 illustrates an example graphical user interface 100 for presenting media application metadata on a display of a computing device. For example, the computing device can be a laptop computer, a desktop computer, a tablet computer, a smartphone, a smart watch, etc. The media application can be a music application, a social networking application, a video application, a messaging application, a navigation application or any other type of application that can present media having audio data, image data, video data and/or textual data on the display of the computing device.

In some implementations, a user can invoke a media software application installed on the computing device. For example, the user can login to or wake the computing device and invoke the media application (e.g., while the device is unlocked). The user can invoke the media application by selecting an icon or other graphic corresponding to the media application presented on a display of the computing device. For example, the display of the computing device can be a touch-sensitive display capable of receiving touch input from the user. The user can touch an area of the display corresponding to the application icon to invoke the application on the computing device.

In some implementations, the media application can present its application data on a graphical user interface of the media application. For example, after the media application is invoked, the media application can present a graphical user interface for presenting media items, media item metadata, and/or application controls on the display of the computing device. For example, the media application can present a graphical user interface of (e.g., built specifically for, part of) the media application. In some implementations, the media application can expose or surface the application data to the user through mechanisms provided by the computing device. For example, the operating system of the computing device can provide application programming interfaces (APIs) that allow the application to present application data on various interfaces of the operating system. For example, the operating system can present the application data (e.g., media items, media item metadata, application controls, etc.) on a lock screen of the computing device, a quick access menu, or other user interfaces managed and controlled by the operating system. For example, the operating system can present the application data using GUI 100.

In some implementations, the media items associated with the media application can have corresponding metadata that describes the media items. For example, when the media item is a track of music, the metadata can include the name of the track, the name of an artist who created the track, and/or the name of an album that includes the track, as illustrated by text element 104. The metadata for a music track can include the length of the track (e.g., in minutes), as illustrated by text element 102. The metadata for the music track can include artwork for the music track or album associated with the music track, as illustrated by graphical element 108. The metadata for the music track can include other information (e.g., music label, copyright, track size, etc.) relevant to the media item. Of course, different types of media items can have different metadata. For example, a movie media item can have metadata that identifies actors, directors, movie studios, etc. A podcast media item can have metadata that identifies a host, speaker, podcast episode, and/or podcast size. A navigation application can present a map or navigation media item that indicates locations, start location, end location, travel time, or other navigation related metadata.

In some implementations, the media application can have application-specific controls. For example, the music application described above can have graphical controls 106 that allow the user to play, fast-forward, and rewind a music track. An internet radio application may only have graphical controls for playing, fast forwarding, and skipping a song. The internet radio application may not have graphical controls for rewinding or replaying a previously played music track, for example. Some media applications may only have a play/stop control. A navigation application may have a start button selectable to begin a route. To cause the media application controls to be displayed on a graphical user interface of the operating system, the media application can send information to the operating system (e.g., invoke an operating system API) describing which controls to display for the media application. The computing device can then display graphical controls appropriate to the media application on a graphical user interface of the operating system (e.g., GUI 100).

In some implementations, the computing device can display GUI 100 while the computing device is locked. For example, while the computing device is unlocked, a user can invoke the music application described above to listen to a music track or playlist. The user can lock the computing device while listening to the music track. Instead of presenting a graphical user interface of the media application, the computing device (e.g., operating system) can present GUI 100 while the computing device is locked to allow the user to manipulate or control the playback of the music tracks played by the music application. For example, GUI 100 can be a graphical user interface of the operating system. For example, GUI 100 can present media item identification information (e.g., text element 104), such as song title, artist, and album information. GUI 100 can present descriptive information (e.g., text element 102) about the media item, such as song length. GUI 100 can present graphical information (e.g., graphical element 108) related to the media item, such as artwork, an icon, or some other graphical information. GUI 100 can present graphical controls (e.g., graphical element 106) that are selectable by a user for manipulating the media item.

In the examples above, the operating system of the computing device receives the media item metadata and the application-specific control information after a user invokes the media application. Stated differently, the computing device can only generate GUI 100, including the metadata and media application controls, after a user invokes the media application and the media application delivers the media item metadata information and the media application control information to the computing device.

However, the example implementations described below can provide the computing device with the capability to anticipate which media application the user is likely to invoke and get the application ready (e.g., prime the application) to service an anticipated user request so that the user merely has to press play (or provide some other simple input) to enjoy the functionality of a media application. For example, while the computing device remains locked, the operating system can automatically launch a media application and send a command to the media application to cause the media application to load appropriate media items and media item metadata in anticipation of the user's imminent use of the media application. After loading the media, the media application can send the media item metadata and application control information to the operating system so that the operating system can generate GUI 100 automatically and without user input to invoke the media application.

Figure 2:
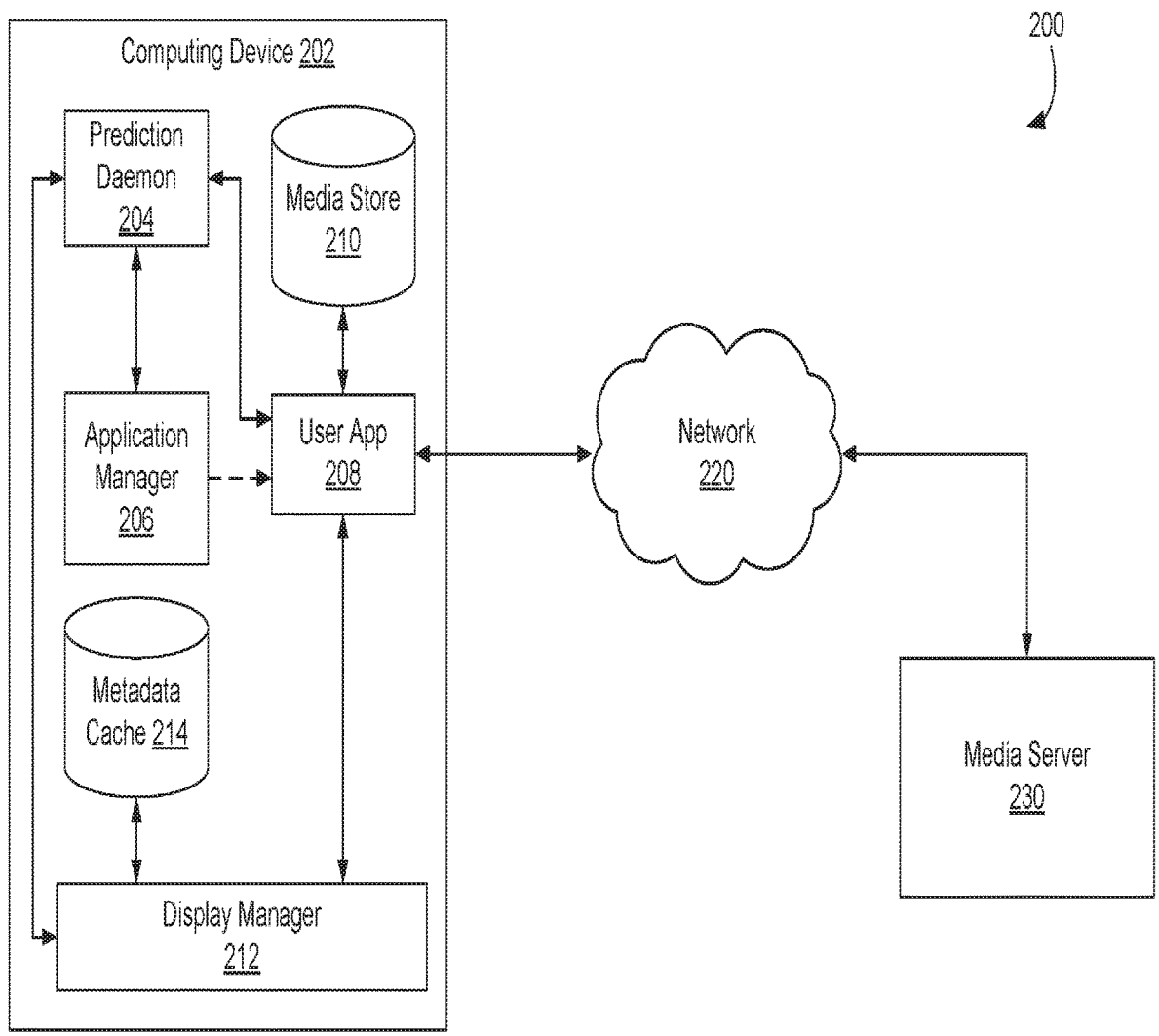
FIG. 2 is a block diagram of an example system for priming media applications.

FIG. 2 is a block diagram of an example system 200 for priming media applications. For example, system 200 can automatically (e.g., predictively) launch a media application and prime the media application for use by the user of the computing device. In some implementations, system 200 can include computing device 202. As described above, computing device can be a computing device, such as a laptop computer, desktop computer, tablet computer, smartphone, smart watch, etc.

In some implementations, computing device 202 can include a prediction daemon 204. For example, prediction daemon 204 can be an operating system process that can monitor events occurring on computing device 202 and predict user behavior and/or user needs based on the monitored events and historical event patterns. For example, monitored events can include location changes, connection of peripheral devices (e.g., headphones, car audio, Bluetooth devices, etc.), device movement (e.g., as detected by an accelerometer of device 202), connecting to particular networks (e.g., home network, work network, cellular data network, etc.), and/or other device events.

In some implementations, prediction daemon 204 can predict which application the user is likely to invoke based on precursor events. For example, when prediction daemon 204 detects an event (e.g., the user's location is the gym and the user has plugged headphones into computing device 202), prediction daemon 204 can determine an application that, based on historical event data, the user is likely to invoke soon after (e.g., within 1 minute, within 2 minutes, etc) the event is detected. Thus, these precursor events can be used to predict a user's needs. For example, prediction daemon 204 can determine based on historical event data that the user usually invokes a music application (e.g., application launch event) after arriving at the gym (e.g., location event) and plugging in headphones (peripheral event). When prediction daemon 204 later detects that the user is located at the gym and has plugged in headphones, prediction daemon 204 can predict that the user will invoke the music application soon after the user has plugged in the headphones.

In some implementations, computing device 202 can include application manager 206. For example, application manager 206 can be an operating system process that manages (e.g., launches, monitors, terminates) applications running on computing device 202. In some implementations, when prediction daemon 204 predicts that the user is about to invoke a particular application on computing device 202, prediction daemon 204 can send a launch request to application manager 206 that identifies the predicted application. Upon receiving the launch request, application manager 206 can launch the predicted application (e.g., user application 208).

In some implementations, prediction daemon 204 can send a priming command to user application 208. For example, after prediction daemon 204 causes application manager 206 to launch user application 208 in anticipation of a user invoking user application 208, prediction daemon 204 can send a priming command to user application 208 to cause user application 208 to load media items and media item metadata into user application 208. For example, after user application 208 is running on computing device 202, user application 208 may remain idle on computing device 202. By sending the priming command to user application 208, prediction daemon 204 can cause user application 208 to load media items that the user might want to view and/or hear.

In some implementations, the priming command can specify which media items user application 208 should load into memory. For example, the priming command can be parameterized with an identification of a media item or media item container (e.g., collection of media items, a playlist, an album, etc.) that user application 208 should load into memory and prepare to playback for the user. For example, prediction daemon 204 might be able to predict based on historical event data that the user typically listens to a particular song or playlist when at the gym. When user application 208 (e.g., a music application) is predictively launched because the user has arrived at the gym, prediction daemon 204 can send a priming command to user application 208 that specifies the particular song or playlist so that user application 208 will load the particular song or playlist in anticipation of the user requesting to play the particular song or playlist.

In some implementations, the priming command can specify a current context of computing device 202. For example, rather than specifying a particular media item that user application 208 should load, the priming command can include contextual information (e.g., the user is at the gym, the user has plugged in headphones) and the user application 208 can determine which media items to load based on the contextual information.

In some implementations, the priming command can specify alternate media applications. For example, prediction daemon 204 can predict the top three media applications that the user is likely to invoke. When priming to first most likely application, prediction daemon 204 can send information identifying the other two most likely applications. The first most likely application may then be able to take advantage of some complimentary functionality between the three applications.

Alternatively, the priming command can be sent to user application 208 without specifying any media items or contextual information and leave it to user application 208 to determine which media items to load in response to the priming command.

In some implementations, the priming command can include policy information. For example, the priming command can specify a Wi-Fi-only policy. The Wi-Fi-only policy can indicate whether user application 208 can use cellular data for priming user application 208. For example, some applications can obtain media items, including media item metadata, from local media store 210. Local media store 210 can be, for example, a local music library, a local video library, a local podcast library, or some other media library. Thus, in some implementations, user application 208 can obtain media items from media store 210 on computing device 202. However, some media applications can or must obtain media items from a remote media server. For example, an internet radio application may obtain media items from a remote internet radio server through the internet. Thus, in some implementations, user application 208 can obtain media items from media server 230 through network 220.

When user application 208 receives a priming command having a Wi-Fi-only policy, user application 208 will only request media items from media server 230 through network 220 when user application 208 is connected to network 220 through a Wi-Fi connection. Stated differently, when user application 208 receives a priming command having a Wi-Fi-only policy, user application 208 will not request media items for predictively priming user application 208 from media server 230 through network 220 when user application 208 is connected to network 220 through a cellular data connection. Thus, computing device 202 can prevent incurring cellular data charges for network activity not expressly requested by the user.

In some implementations, user application 208 can send application data to display manager 212. For example, display manager 212 can be an operating system process that manages various graphical user interfaces of the operating system of computing device 202. Display manager 212 can control the information that is displayed on a lock screen of computing device 202, for example. Display manager 212 can, for example, control the information that is displayed on a quick access menu or GUI of computing device 202.

In some implementations, after user application 208 is primed (e.g., has loaded its media items), user application 208 can send media item metadata corresponding to the primed (e.g. loaded) media item or media items to display manager 212. For example, if user application 208 is a music application, user application 208 can send metadata corresponding to the first song that will be played when the user selects a graphical control (e.g., play button) associated with user application 208. The metadata can include textual descriptive information (e.g., name of media item, author of media item, length of media item). The metadata can include graphical information (e.g., album art, graphical icon, etc.), as described above.

In some implementations, display manager 212 can cache media item metadata received from user application 208 in metadata cache 214. Metadata cache 214 can be, for example, a repository of information stored in volatile memory for quick access by display manager 212. For example, the operating system of computing device 202 (e.g., application manager 206) can be configured to terminate idle applications. If application 208 is terminated, display manager 212 may no longer be able to obtain media item metadata from user application 208. By caching the metadata for the next media item to be played by user application 208, display manager 212 can obtain and present the media item metadata as needed without having to re-launch user application 208.

In some implementations, user application 208 can send metadata caching policies to display manager 212. For example, the caching policies can include a no-caching policy, a persistent caching policy, and/or a periodic caching policy. In some implementations, when user application 208 sends media item metadata to display manager 212, user application 208 can specify a no-caching policy. For example, when the no-caching policy is specified by user application 208, display manager 212 will not store the media item metadata received from user application 208 in metadata cache 214. For example, this no-caching caching policy can be specified by media applications that are unpredictable with respect to which media item will be loaded and played next by the media application. For example, if user application 208 is an internet radio application, user application 208 may only be able to determine which song or radio segment is playing now. Thus, caching the metadata for the song may not be useful because the currently playing song may be different by the time the cached metadata is presented by display manager 212.

In some implementations, when user application 208 sends media item metadata to display manager 212, user application 208 can specify a persistent caching policy. For example, a user application 208 can be predicable with respect to which media item will be played next. For example, a music application that was playing through a playlist when terminated, may predictably resume playing the playlist at the last song played when launched by application manager 206. The next media item to be played by the media application may not change until a user interacts with the media application to cause the next media item or a different media item to be presented. Thus, when delivering metadata for the last song played, this predictable user application 208 can specify a persistent caching policy that indicates to display manager 212 the cached media item metadata should persist in media cache 214 (e.g., until the media application loads, plays, or presents another media item).

In some implementations, when user application 208 sends media item metadata to display manager 212, user application 208 can specify a periodic caching policy. For example, user application 208 may be able to identify the next media item to be presented by user application 208 but only for a certain period of time (e.g., the next 5 minutes, the next 24 hours, the next week, etc.). For example, if user application 208 is an internet radio application, user application 208 may be able to determine the length (e.g., remaining period of time) of a currently playing radio segment. User application 208 can provide the remaining amount of time left in the radio segment as a parameter to the periodic caching policy. Display manager 212 can store the media item metadata in metadata cache 214 with a timestamp indicating when the metadata will no longer be valid. When display manager 212 later retrieves the metadata from cache 214, display manager 212 can determine based on the expiration timestamp that the metadata is no longer valid, and can send a priming command to user application 208 to get metadata for the next media item to be played or presented by user application 208.

In some implementations, user application 208 can send application control information to display manager 212. For example, user application 208 may have application-specific controls (e.g., play, rewind, fast forward, like, dislike, skip, etc.) for controlling the playback or presentation of media items. User application 208 can send the application-specific control information to display manager 212 so that display manager 212 can present the correct controls for the primed user application 208. In some implementations, display manager 212 can store the application control information in metadata cache 214 so that display manager 212 can subsequently obtain and present the control information without having to prime user application 208.

In some implementations, display manager 212 can present media item metadata and/or media application controls on a display of the computing device. For example, when a user provides some input or stimulus to cause the lock screen of the computing device to be displayed, display manager 212 can present the media item metadata and/or media application controls for the predicted media application (e.g., user application 208) on the lock screen graphical user interface of the computing device, as illustrated by FIG. 3 below.

Figure 3:
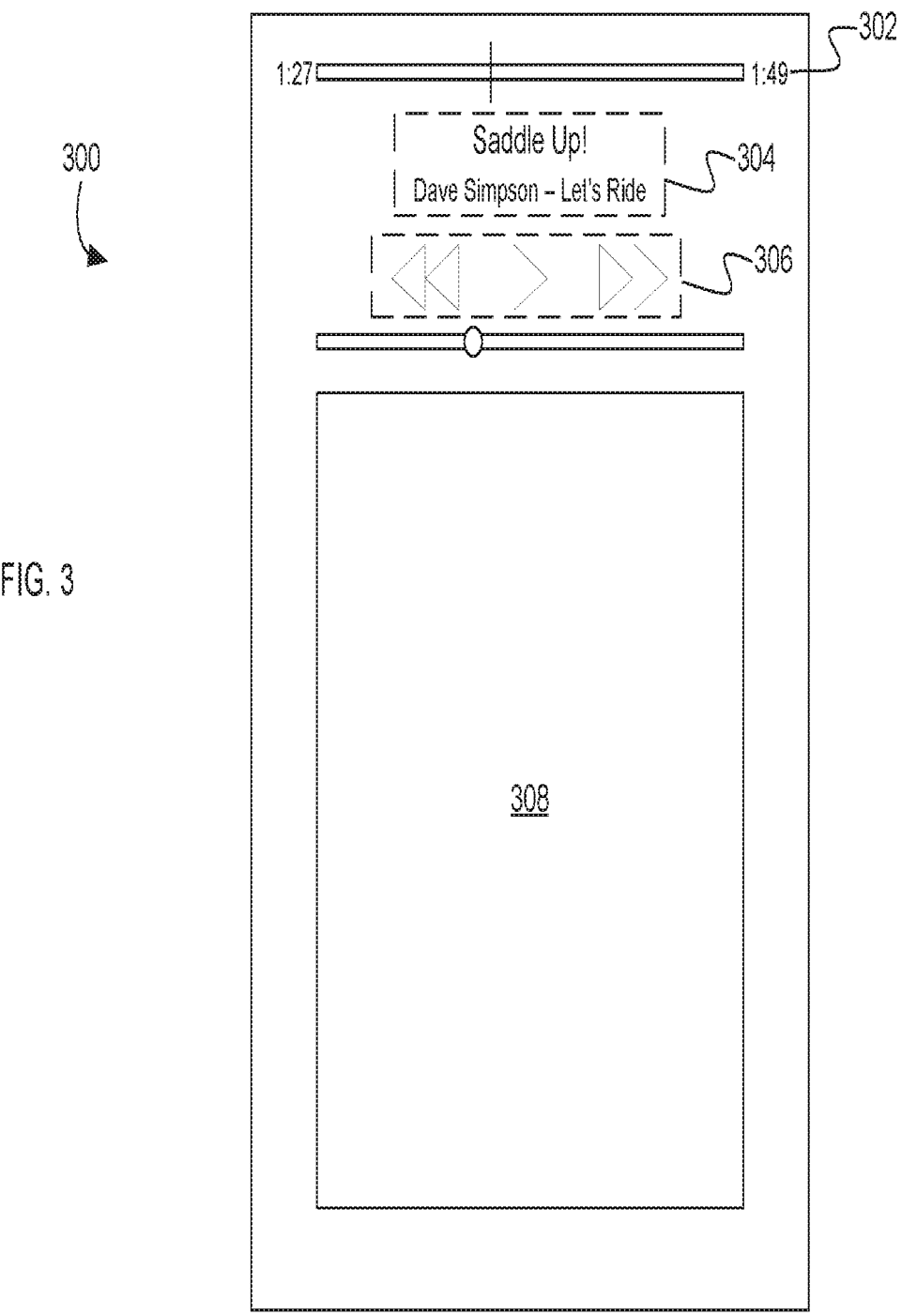
FIG. 3 illustrates an example graphical user interface for presenting media item metadata and application controls for a predicted user application

FIG. 3 illustrates an example graphical user interface 300 for presenting media item metadata and application controls for a predicted user application. Similar to GUI 100 of FIG. 1, GUI 300 can be configured to present media item identification information (e.g., text element 304), media item description information 302, and/or media item graphical information (e.g., 308). GUI 300 can present graphical controls (e.g., graphical elements 306) for controlling playback or presentation of media items by a media application (e.g., user application 208). However, rather than presenting media item and media application information corresponding to a media application invoked by the user (e.g., like GUI 100), GUI 300 can present media item and media application information corresponding to media application that was automatically (e.g., predictively) launched by computing device 202, as described above.

For example, computing device 202 may be in a standby or low power state with the device locked and the display turned off (e.g., not illuminated). The user can arrive at the gym with computing device 202 and plug headphones into computing device 202 in preparation for a workout. Prediction daemon 204 can detect when the headphones are plugged in, determine the location (e.g., gym) of computing device 202, and predict that the user will likely invoke the music application (e.g., user application 208) on computing device 202. In some implementations, prediction daemon 204 can predict which song or playlist the user will select at the gym.

Based on this prediction, computing device 202 can launch the music application and send a priming command (e.g., including an identification of a predicted song or playlist) to the music application to load some music (e.g., the predicted music) into the memory of the music application. After priming, the music application can send the music metadata and control information to display manager 212 so that when the display of computing device 202 is illuminated (e.g., illuminated in response to plugging in the headphones or in response to some user input), GUI 300, including the metadata and controls for the predicted application, can be presented on the illuminated display. Thus, to the user's surprise, the media item that the user wishes to hear or view is already prepared for the user's enjoyment. After GUI 300 is presented on the display of computing device 202, the user can simply press play to listen to the user's favorite music without having to unlock the device, select the music application, select music, and/or perform various other types of input.

Figure 4:
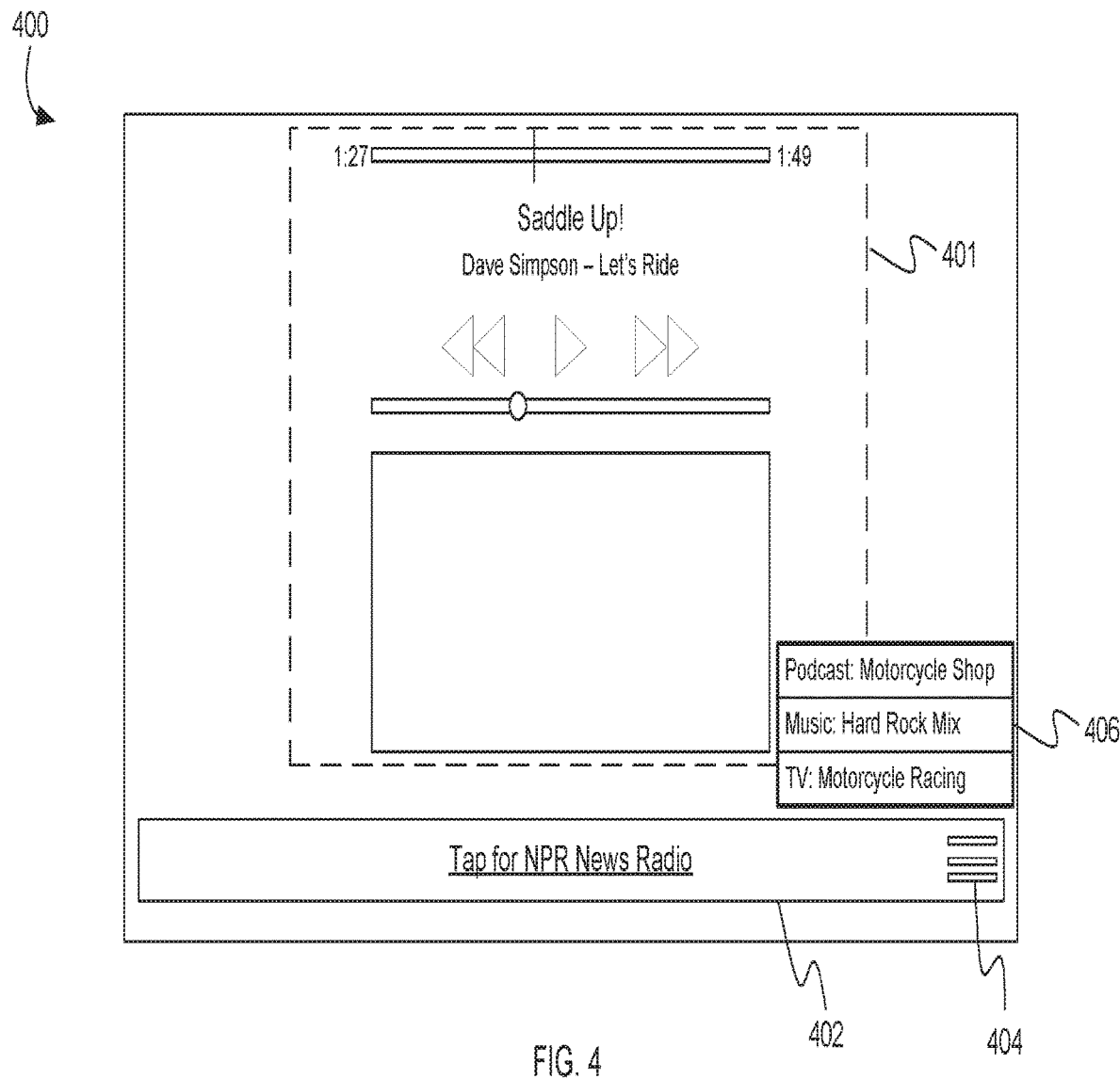
FIG. 4 illustrates an example graphical user interface for presenting alternative media application information.

FIG. 4 illustrates an example graphical user interface 400 for presenting alternative media application information. For example, prediction daemon 204 can predict an application that the user is likely to invoke based on precursor events, as described above. However, in some implementations, prediction daemon 204 can determine that the user may invoke one of several user applications 208 based on some detected precursor events. Prediction daemon 204 can, for example, generate a prioritized list of (e.g. 2 or 3) applications that the user is likely to invoke based on the precursor events. When the application invocation prediction generated by prediction daemon 204 includes multiple predicted media applications, prediction daemon 204 can request that application manager 206 launch some or all of the predicted applications. In some implementations, prediction daemon 204 can send the prioritized list of predicted applications to display manager 212.

After the applications are launched and primed, as described above, display manager 212 can generate GUI 400. For example, GUI 400 can present media item metadata and media application controls similar to GUI 100 and GUI 300, described above. In some implementations, the media item metadata and the media application controls presented on GUI 400 in playback area 401 can, at least initially, correspond to the first media application (e.g., the application most likely to be invoked by the user, the highest priority application, etc.) in the prioritized list of predicted applications.

In some implementations, GUI 400 can include graphical elements that the user can select to switch to another one of the predicted applications in the prioritized list. For example, GUI 400 can include graphical element 402 (e.g., a button, a banner, etc.) which, when selected, causes the media item metadata and application controls for the first media application in the prioritized list presented in playback area 401 on GUI 400 to be replaced with media item metadata and application controls corresponding to another (e.g., the second) media application in the prioritized list. Thus, selectable graphical element 402 can provide a mechanism by which the user can switch (e.g., toggle) GUI 400 from displaying the information and controls for one predicted application to displaying the information and controls for another predicted application.

In some implementations, the prioritized list of predicted media applications can include more than two media applications. For example, prediction daemon 204 may identify four (4) media applications that are likely to be invoked by the user based on detected precursor events. In some implementations, GUI 400 can present graphical elements that allow the user to select one of the predicted applications in the prioritized list. For example, GUI 400 can include graphical element 404 (e.g., a button). When a user selects graphical element 404, GUI 400 can present graphical element 406 (e.g., a window, menu, etc.) that lists predicted media applications in the prioritized list. For example, graphical element 406 can include the predicted media applications for which information is not already presented on GUI 400. For example, graphical element 406 will not include the first priority media application because information for the first priority media application is already presented on GUI 400. If GUI 400 includes graphical element 402 and graphical element 402 identifies the second priority media application, graphical element 406 will not include the second priority media application. When the user selects one of the media applications listed on graphical element 406, GUI 400 can present the media item metadata and application controls for the selected media application in playback area 401 on GUI 400, as described above.

Figure 5:
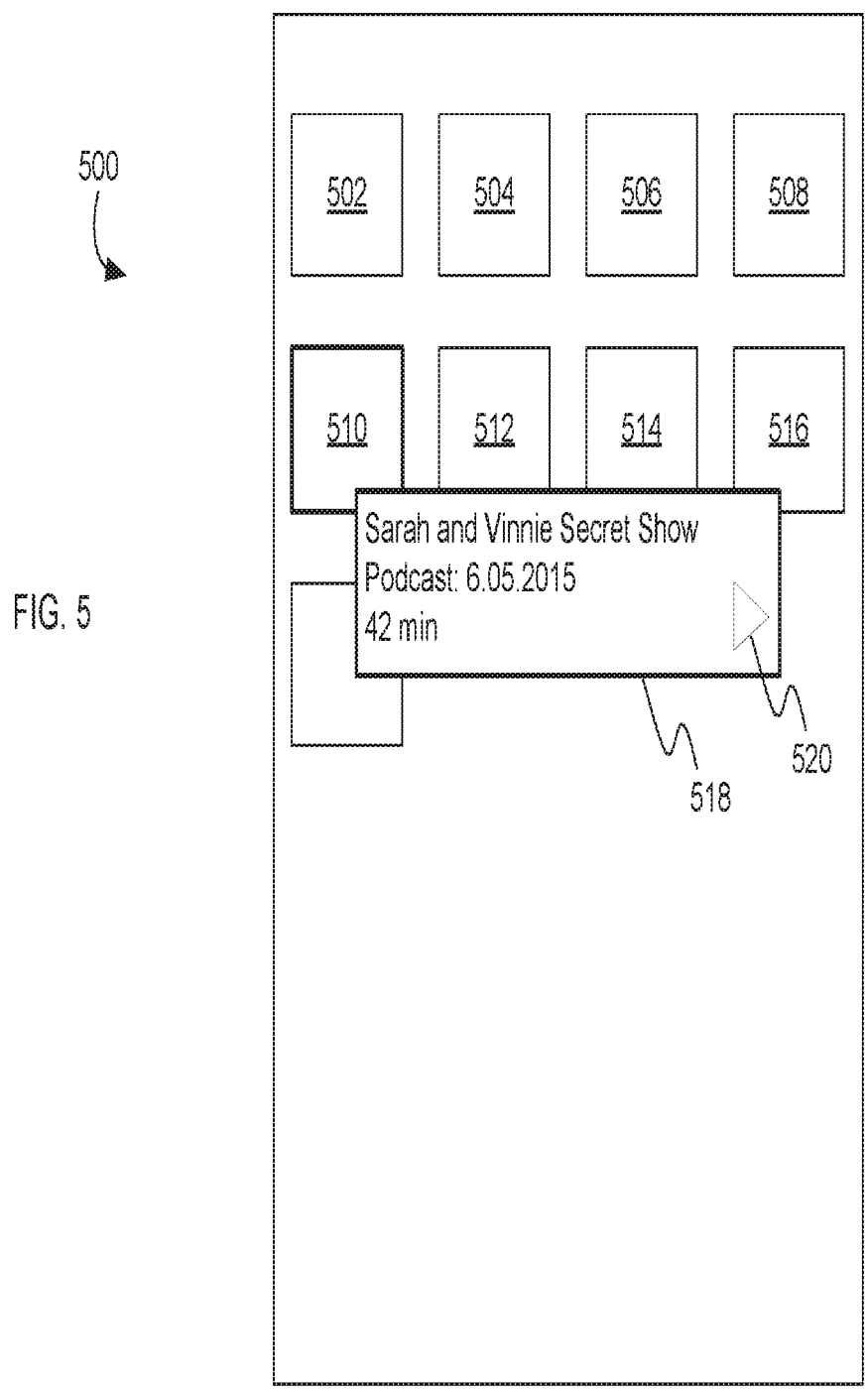
FIG. 5 illustrates an example graphical user interface for presenting a media application preview on a computing device.

FIG. 5 illustrates an example graphical user interface 500 for presenting a media application preview on a computing device. For example, GUI 500 can be an application navigation screen displayed on a computing device. GUI 500 can present graphical elements 502-516 representing respective media applications installed on the computing device. In some implementations, GUI 500 can present graphical element 518 that presents a preview of media item information for a media item that will be presented by a corresponding application when the user later invokes the application. For example, a user can provide a preview input with respect to graphical element 510. Graphical element 510 can correspond to a podcast application, for example. In some implementations, the preview input can be a touch input. For example, if the user merely taps (e.g., provides a brief touch input) graphical element 510, the podcast application will be launched by the computing device. However, if the user provides a prolonged touch input (e.g., a touch input sustained for a period of time), GUI 500 can present the preview (e.g., graphical element 518) for the podcast application. For example, graphical element 518 can include media item metadata (e.g., title of the podcast, length of the podcast, etc.) and/or media application controls (e.g., graphical element 520) corresponding to the media application represented by selected graphical element 510. For example, a user can initiate playback of the podcast described by preview graphical element 518 by selecting graphical element 520 (e.g., a play button).

In some implementations, GUI 500 can obtain the media item metadata and/or media application controls for the selected media application. For example, in response to detecting the preview input for a corresponding media application, display manager 212 can determine if cached metadata exists for the media application in metadata cache 214. If cached metadata is available and valid (e.g., hasn't expired), display manager 212 can obtain the media item metadata and/or application control information for the media application from metadata cache 214.

If no cached metadata exists for the media application or if the cached metadata has expired (e.g., is no longer valid), display manager 212 can request that application manager 206 launch the media application (e.g., user application 208) as a background process on computing device 202. After user application 208 is launched, display manager 212 can send a priming command to the media application. After the media application loads its media items and media item metadata, the media application can send the media item metadata and application control information to display manager 212. Display manager 212 can then present the media item metadata and application control information for the selected media application on preview graphical element 518. Thus, while the user is providing the preview input, the computing device can launch, prime, and/or collect the media application data for the preview graphical element 518.

In some implementations, GUI 500 can obtain the media item metadata and/or media application controls for multiple applications when preparing to present GUI 500. For example, display manager 212 can obtain media item metadata and/or media application control information for all or a portion of the media applications represented by application graphical elements 502-516. For example, when GUI 500 is initially displayed (e.g., before preview graphical element 518 is displayed), display manager 212 can determine whether cached media metadata is available for the media applications. If cached metadata is available and valid (e.g., hasn't expired), display manager 212 can obtain the media item metadata and/or application control information for each media application from metadata cache 214.

If no cached metadata exists for a media application or if the cached metadata has expired (e.g., is no longer valid), display manager 212 can request that application manager 206 launch the media application (e.g., user application 208) as a background process on computing device 202. After the media application is launched, display manager 212 can send a priming command to the media application. After the media application loads its media items and media item metadata, the media application can send the media item metadata and application control information to display manager 212. In some implementations, display manager 212 can periodically launch the media applications represented in GUI 500 in order to collect up to date media item metadata from each of the applications. When the user provides a preview input with respect to one of the media applications represented on GUI 500, display manager 212 can present the media item metadata and application control information for the selected media application on preview graphical element 518.

Example Process

Figure 6:
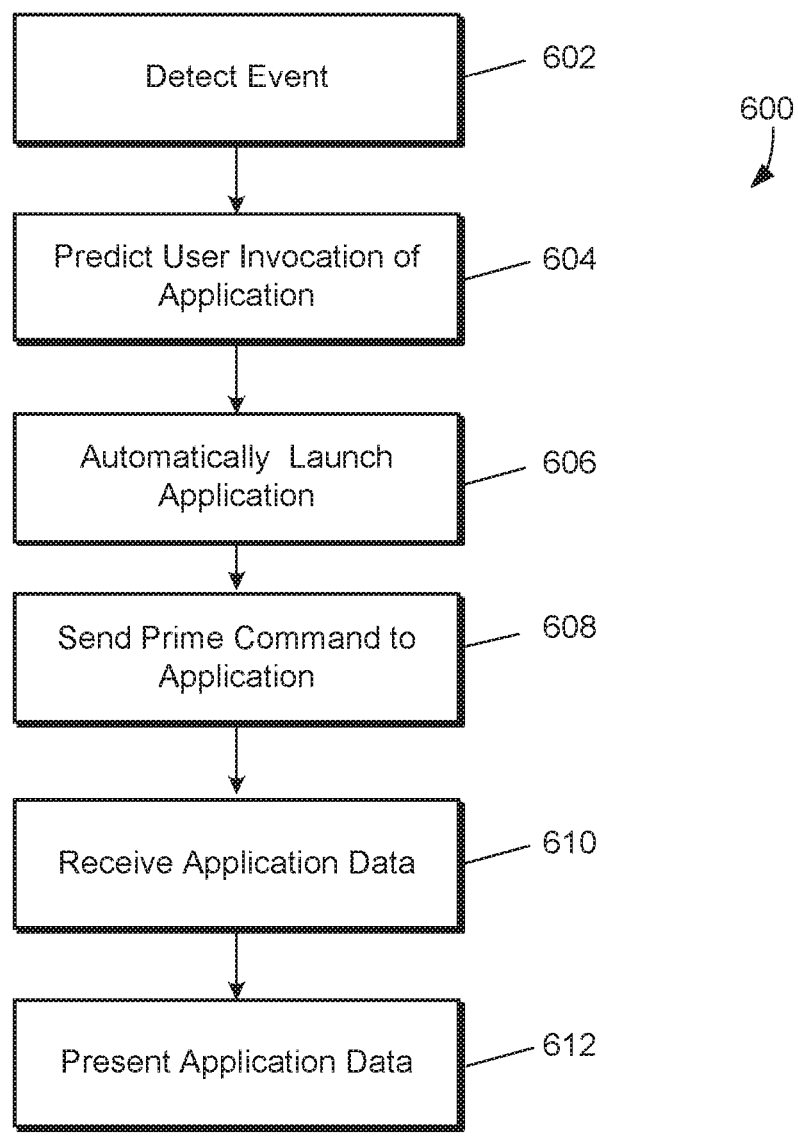
FIG. 6 is flow diagram of an example process for priming media applications.

FIG. 6 is flow diagram of an example process 600 for priming media applications. For example, a media application can be primed with media items so that the media application is can playback or present the media items to a user with a minimal amount of user input.

At step 602, a computing device can detect an event. For example, the computing device can detect one or more events, such as the user connecting a peripheral device, connecting to a network, changing or arriving at a location, or any other event detectable by the computing device.

At step 604, the computing device can predict a user invocation of an application based on the detected events. For example, some events can be precursors to the user invoking an application or performing some other activity. The computing device can, for example, predict which application the user is likely to invoke based on a detected precursor event.

At step 606, the computing device can automatically launch the predicted application. For example, the computing device can automatically launch the predicted application as a background process in response to detecting the precursor event.

At step 608, the computing device can send a priming command to the launched application. For example, the priming command can cause the application to load application data (e.g., media items, media item metadata, etc.) into the memory corresponding to the application. After the application loads the application data, the application can send a portion of the application data to the computing device (e.g., to display manager 212).

At step 610, the computing device can receive application data from the launched application. For example, the application data can include media item metadata, application control information, and/or caching policies.

At step 612, the computing device can present the application data on a display of the computing device. For example, the computing device can present the media item metadata and/or application control information on the lock screen of the computing device.

While the description above describes implementations where the various graphical user interfaces and/or graphical element are presented on a display of the computing device, other implementations are possible. For example, the computing device can connect (e.g., wired or wirelessly) to a peripheral devices or accessories connected to the computing device. The computing device can cause the graphical user interfaces described above to be presented by the peripheral devices and/or accessories. For example, when the computing device is connected to an automotive entertainment device (e.g., car stereo, video head unit, etc.), the graphical user interfaces and/or graphical elements described above can be presented on a display of the automotive entertainment device. The automotive entertainment device can be configured to receive user input to control the media items and/or media applications installed on the computing device.

Example System Architecture

Figure 7:
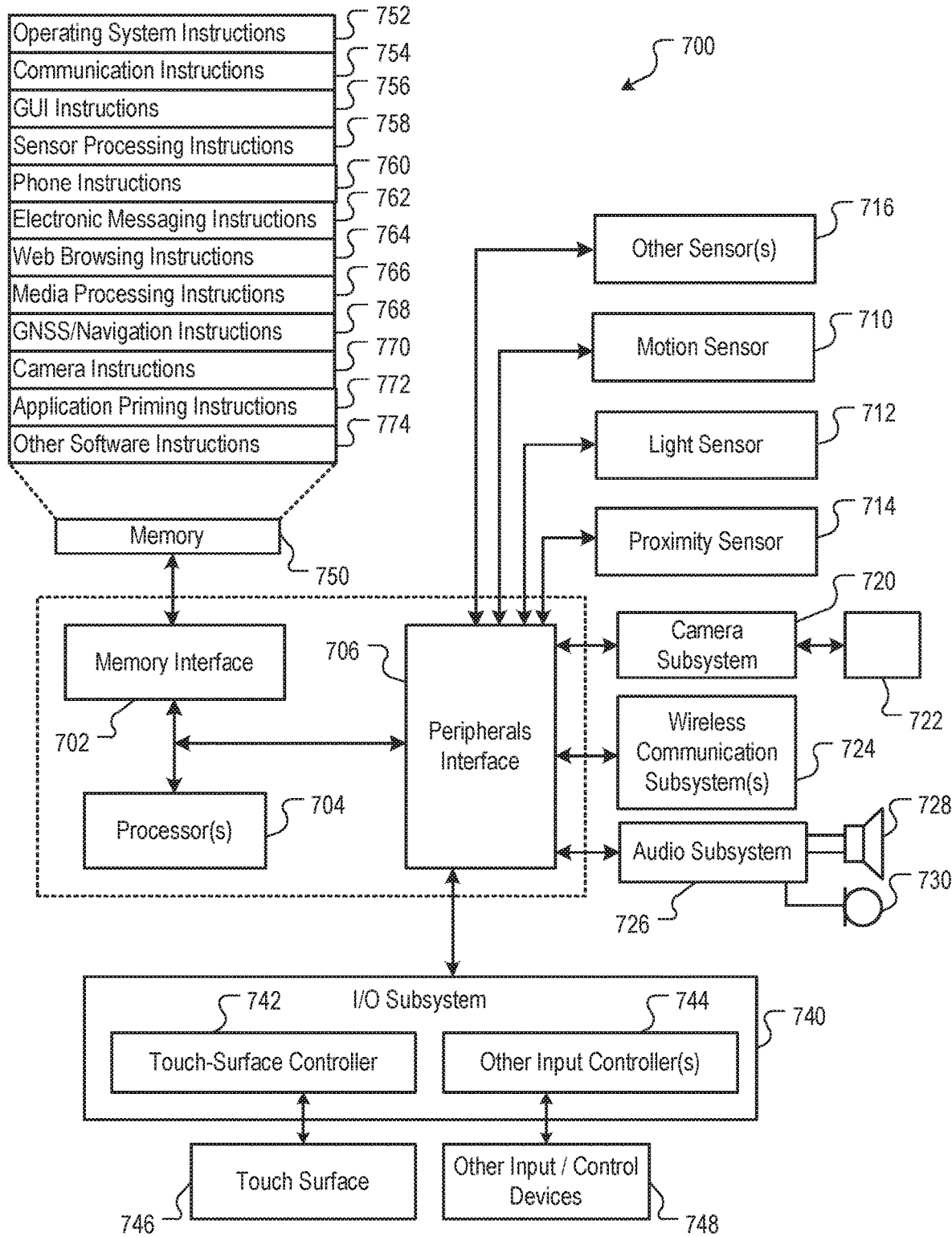
FIG. 7 is a block diagram of an example computing device that can implement the features and processes of FIGS. 1-6

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and LMPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the media application priming features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the media application priming processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
   detecting, by a computing device, an event corresponding to an activity of a user in relation to the computing device;
   based on the detected event, predicting, by the computing device, an application that is about to be invoked by the user;
   determining, by the computing device, contextual information associated with the user, the contextual information identifying a current connection of at least one peripheral device to the computing device; and
   sending, by the computing device, a priming command to the predicted application, the priming command causing the predicted application to load one or more media items into memory associated with the predicted application, wherein the priming command includes the contextual information.

2. The method as recited in claim 1, further comprising:
   automatically launching, by the computing device, the predicted application in response to predicting that the application is about to be invoked by the user.

3. The method as recited in claim 1, further comprising:
   receiving, by the computing device from the predicted application, application data describing the one or more media items loaded by the predicted application in response to sending the priming command; and
   presenting, by the computing device, the application data on a second graphical user interface (GUI) of the computing device separate from a first GUI of the predicted application.

4. The method as recited in claim 1, further comprising:
   predicting, by the computing device, the one or more a-media items that the user is likely to select, wherein the priming command sent to the predicted application includes an identifier corresponding to the one or more media items.

5. The method as recited in claim 1, wherein the detected event comprises arrival of the computing device at a particular location.

6. The method as recited in claim 1, further comprising:
determining, by the computing device, device movement using an accelerometer of the computing device, wherein the contextual information includes the device movement.

7. The method as recited in claim 1, wherein the contextual information includes a current location of the computing device.

8. The method as recited in claim 1, wherein the contextual information identifies a current configuration of the computing device.

9. The method as recited in claim 1, wherein the priming command includes a networking policy that specifies a type of network connection authorized to be used by the predicted application to obtain the one or more media items from a particular network resource, and wherein responsive to the authorized type of network connection not being available, the predicted application does not obtain the media items from the network resource.

10. A non-transitory computer-readable medium including one or more sequences of instructions that, when executed by one or more processors, causes:
detecting, by a computing device, an event corresponding to an activity of a user in relation to the computing device;
based on the detected event, predicting, by the computing device, an application that is about to be invoked by the user;
determining, by the computing device, contextual information associated with the user, the contextual information identifying a current connection of at least one peripheral device to the computing device; and
sending, by the computing device, a priming command to the predicted application, the priming command causing the predicted application to load one or more media items into memory associated with the predicted application, wherein the priming command includes the contextual information.

11. The non-transitory computer-readable medium as recited in claim 10, wherein the instructions cause:
automatically launching, by the computing device, the predicted application in response to predicting that the application is about to be invoked by the user.

12. The non-transitory computer-readable medium as recited in claim 10, wherein the instructions cause:
receiving, by the computing device from the predicted application, application data describing the one or more media items loaded by the predicted application in response to sending the priming command; and
presenting, by the computing device, the application data on a second graphical user interface (GUI) of the computing device separate from a first GUI of the predicted application.

13. The non-transitory computer-readable medium as recited in claim 10, wherein the instructions cause:
predicting, by the computing device, the one or more media items that the user is likely to select, wherein the priming command sent to the predicted application includes an identifier corresponding to the one or more media items.

14. The non-transitory computer-readable medium as recited in claim 10, wherein the detected event comprises arrival of the computing device at a particular location.

15. The non-transitory computer-readable medium as recited in claim 10, wherein the instructions cause:
determining, by the computing device, device movement using an accelerometer of the computing device, wherein the contextual information includes the device movement.

16. The non-transitory computer-readable medium as recited in claim 10, wherein the contextual information includes a current location of the computing device.

17. The non-transitory computer-readable medium as recited in claim 10, wherein the contextual information identifies a current configuration of the computing device.

18. The non-transitory computer-readable medium as recited in claim 10, wherein the priming command includes a networking policy that specifies a type of network connection authorized to be used by the predicted application to obtain the one or more media items from a particular network resource, and wherein responsive to the authorized type of network connection not being available, the predicted application does not obtain the media items from the network resource.

19. A system comprising:
one or more processors; and
a non-transitory computer-readable medium including one or more sequences of instructions that, when executed by the one or more processors, causes:
detecting, by the one or more processors, an event corresponding to an activity of a user in relation to the system;
based on the detected event, predicting, by the one or more processors, an application that is about to be invoked by the user;
determining, by the computing device, contextual information associated with the user, the contextual information identifying a current connection of at least one peripheral device to the computing device; and
sending, by the one or more processors, a priming command to the predicted application, the priming command causing the predicted application to load one or more media items into memory associated with the predicted application, wherein the priming command includes the contextual information.

20. The system as recited in claim 19, wherein the instructions cause:
automatically launching, by the one or more processors, the predicted application in response to predicting that the application is about to be invoked by the user;
receiving, by the one or more processors from the predicted application, application data describing the one or more media items loaded by the predicted application in response to sending the priming command; and
presenting, by the one or more processors, the application data on a second graphical user interface (GUI) of the system separate from a first GUI of the predicted application.

* * * * *